3,119,355
APPARATUS FOR THE BAKING OF BREAD AND OTHER BAKERY PRODUCTS WITH INFRA-RED RAYS
Franz Gawlitza, Berlin-Johannisthal, and Martin Höntzsch and Ferdinand Schmitz, Dresden-Radebeul, Germany, assignors to Verband Deutscher Konsumgenossenschaften G.m.b.H., Berlin, Germany
Original application Oct. 23, 1959, Ser. No. 848,425. Divided and this application Dec. 22, 1960, Ser. No. 77,628
5 Claims. (Cl. 107—57)

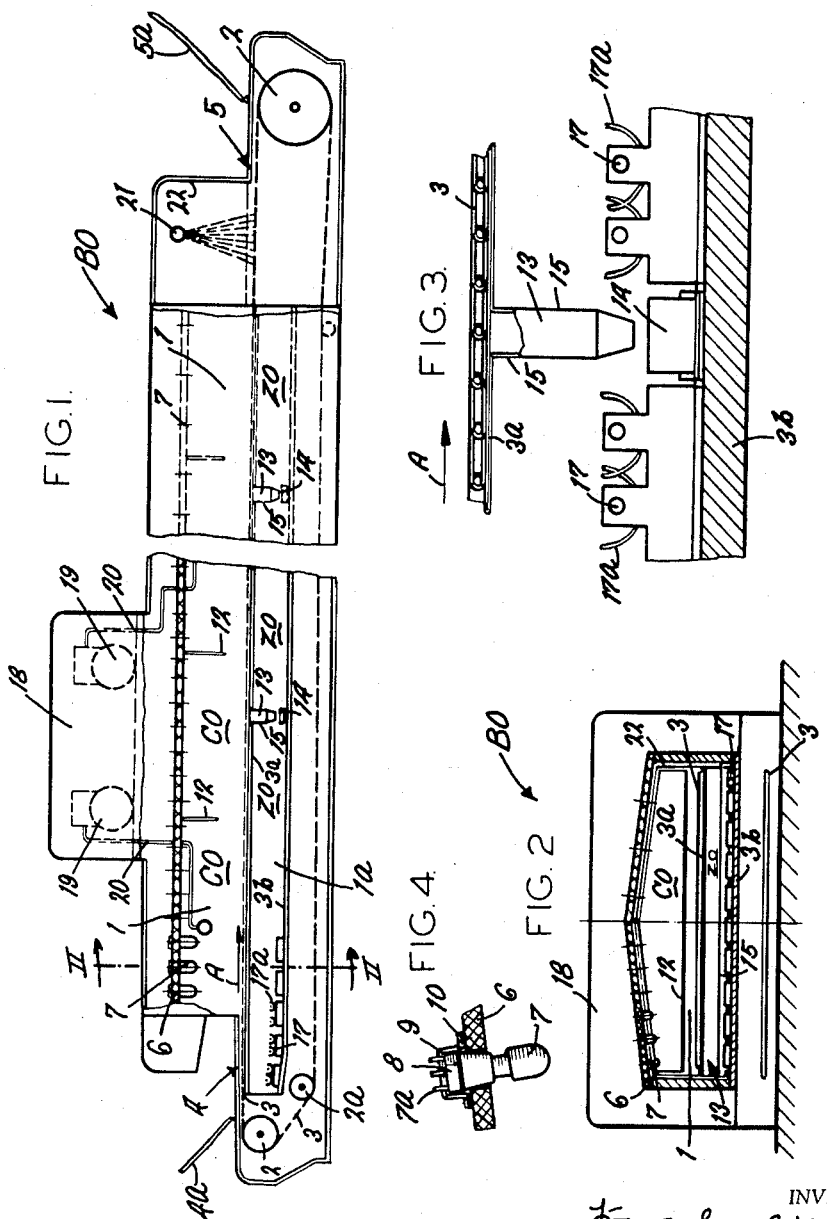

The present application is a division of our application Serial No. 848,425, filed October 23, 1959, entitled "Method of and Apparatus for the Baking of Bread and Other Bakery Products With Infra-Red Rays."

The present invention relates to an apparatus for the baking of bread, rolls and other bakery products by means of radiant heat, and more particularly with the help of short-wave infra-red rays.

It is already known to utilize infra-red rays in the baking of bread and of certain other bakery products. However, all such known methods are based on the utilization of long-wave infra-red rays. The rays are stored in a heat-absorbent body, e.g. a suitable ceramic or the like, by the burning of coal, gas, oil or with the help of electrical energy, and the heat-absorbent body then emits the rays in the desired direction or directions. The baking process is carried out by simultaneous addition of moisture for a short period of time not exceeding 1½ minutes. Such methods are utilized in connection with the baking of bread and also in connection with the baking of certain flat bakery products, such as biscuits and the like.

All presently known methods of baking bread and like bakery products which are based on the use of infra-red rays invariably bring about a mere drying or roasting action upon the advancing products, and are connected with very high losses in heat energy. Thus, under optimum operating conditions, the ratio of usefully spent heat does not exceed 30 percent, and the baking operation requires comparatively long periods of time. For example, a loaf of bread weighing 1½ kg. will be baked in about 45 to 50 minutes, and even a roll weighing about 40 grams requires between 16 and 18 minutes before the baking is completed.

A further serious drawback of all presently known and utilized methods of baking bread, rolls and other bakery products is in that the oven must be carefully treated before the actual baking can begin, which results in heat losses and is connected with additional expenditures in time. Thus, each presently utilized infra-red baking oven requires careful heating to comvparatively high temperatures before the first batch of bakery products can be placed therein. Whenever the baking of a batch is completed, the oven must be reheated to a temperature of between 240–250° C., thus enabling the heat-emitting medium to store sufficient long-wave infra-red heat energy which is thereupon emitted during subsequent baking of the next batch.

An added disadvantage of all presently utilized apparatus for the practice of the above described conventional methods is in their high initial cost, in complicated construction, in likelihood of malfunction, and in their inability to rapidly react if a change in the operating conditions is desired.

An important object of the present invention is to provide an apparatus for baking bread with the help of short-wave infra-red rays which redures in half the time necessary for the baking of such products in accordance with presently utilized methods.

Another important object of the invention is to provide an apparatus of the above outlined characteristics which may be utilized in connection with the baking of bread as well as with the baking of many other products of similar consistency.

An additional object of the instant invention is to provide an infra-red baking oven for the practice of the above outlined method which prevents, or reduces the likelihood of, the contamination of component parts installed in the baking chamber.

A still further object of the invention is to provide an oven for the baking of bread and other bakery products with the help of short-wave infra-red rays which is so constructed that any impurities which might detrimentally affect the baking operations are continuously and automatically removed from the baking chamber.

A yet further object of the instant invention is to provide a baking oven of the above outlined characteristics which utilizes infra-red lamps of the type capable of rapidly reacting if a change in the operating conditions is desired.

Still another object of the invention is to provide a baking oven which operates with greater efficiency and with lower heat losses than the ovens of presently known design.

A concomitant object of the invention is to provide a baking oven in which the sources of short-wave infra-red rays are arranged in such a way as to prevent cracking and to insure swelling of the products to maximum volume.

The infra-red oven for the practice of our invention comprises a steam-tight housing formed with sealable inlet and discharge openings for the loading and unloading, respectively, of the goods to be baked, the housing defining a baking chamber which is divided into an upper and a lower chamber by a horizontal conveyor adapted to move the goods from the inlet toward the discharge opening. The upper chamber contains an insulating panel which serves as a carrier or support for a number of infra-red lamps preferably arranged in such a way that their heating effect upon the goods diminishes in a direction from the inlet toward the discharge opening. The insulating panel also supports a series of vertical partitions which divide the upper baking chamber into a number of compartments and prevent an equalization of temperatures in the adjacent compartments. The lower chamber is also subdivided into a series of compartments and contains heat absorbing and emitting elements which radiate the stored heat toward the undersides of the conveyed bakery products. The partitions in the lower baking chamber preferably serve as a means for leading away solid impurities which would normally settle on the conveyor, on the infra-red lamps and other parts in the baking chambers.

The apparatus further comprises means for delivering water vapor into selected compartments of both baking chambers, as well as various heat-measuring, damp- and steam-evacuating and other control devices which insure satisfactory and readily variable operating conditions in the baking oven.

Other features of the improved oven reside in the provision of a novel mounting for the infra-red lamps, in the provision of a sprinkling and cooling system for the baked goods, in the provision of means for evacuating fumes from the oven, and in the provision of interchangeable receptacles for solid impurities discharged by the partitions or chutes in the lower baking chamber.

The novel features which are considered as characteristic for the invention are set forth in particular in the appended claims. The invention itself, however, both as to its construction and its method of operation, together with additional objects and advantages thereof, will be understood from the following detailed description of a specific embodiment when read in connection with the accompanying drawing, in which:

FIG. 1 is a longitudinal vertical section through the baking oven embodying our invention;

FIG. 2 is a transverse vertical section taken along the line II—II of FIG. 1, as seen in the direction of arrows;

FIG. 3 is an enlarged fragmentary detail view showing a chute and a receptacle for solid impurities; and FIG. 4 is a fragmentary detail view showing the mounting of an infra-red lamp.

Referring now in greater detail to the illustrated embodiment, the baking oven BO comprises a housing defining a tunnel-shaped steam-tight baking chamber which includes an upper baking chamber 1 formed above the upper run of a continuously driven horizontal chain conveyor 3 travelling over spaced guiding and deflecting sprockets 2, 2a one of which is rotated by a non-represented electric motor or the like. The upper run of the conveyor 3 advances along a horizontal supporting plate 3a in the direction indicated by the arrow A. The raw bakery products to be baked in the chamber 1 are loaded onto the chains or links of the conveyor 3 through an inlet or entry opening 4, and the baked products may be removed at the other end of the upper baking chamber 1 through the discharge opening 5. The openings 4 and 5 in the housing forming part of the oven BO may be exposed and sealed in a fully automatic way or by manual operation of the lids or trap doors 4a, 5a, respectively. These trap doors may be replaced by flexible sliding doors or the like.

The upper side of the upper baking chamber 1 is bounded by an insulating support or carrier plate 6 which constitutes the upper wall of said chamber and holds say 360 short-wave infra-red lamps 7, these lamps extending into the chamber 1 and serving as a means for producing the necessary heat above and below the upper run of the conveyor 3. As is shown in FIG. 4, the sockets 8 of lamps 7 are of conical shape and have a mere linear contact with the walls of the respective openings in the insulating support plate or panel 6. That end of each socket 8 which extends upwardly beyond the panel 6 is covered by an insulating cap 9, the latter being held in proper position by an internally threaded retaining ring 10 or the like. The ring 10 facilitates ready removal of the lamp 7 and, together with the cap 9, insures steam-tight sealing of each opening in the supporting panel 6. The lamps 7 may be of any well known type, for example, the one having a stem made of hardened glass known under the name "Pyrex" (trademark). Terminals or contactors 7a serve as a means for connecting the lamps to a nonrepresented source of electrical energy.

The upper and lateral sides of the bakery products advancing with the conveyor 3 from the inlet opening 4 toward the discharge opening 5 are subjected to direct radiation of the lamps 7. As is best shown in FIG. 1, the chamber 1 is subdivided into a series of compartments CO by vertical partitions or walls 12. The compartments closer to the inlet or leading opening 4 contain a larger number of lamps 7 than those adjacent to the discharge opening 5. The partitions or vertical walls 12 prevent an equalization of temperatures prevailing in the adjacent compartments of the upper baking chamber 1.

The baking chamber of the infra-red oven BO further comprises a second or lower baking chamber 1a which extends along and below the upper run of the conveyor 3. This lower chamber 1a is subdivided by vertical chutes 13 which simultaneously serve as a means for conveying undesirable solid impurities into the receptacles 14 therebelow. The chutes 13 are formed by vertical walls 15 and communicate with spaced openings provided in the supporting plate 3a for the upper run of the conveyor 3. Any particulate matter entrained by the links of the conveyor 3 along the upper side of the plate 3a will automatically drop into the chutes 13 which extend the full width of the lower baking chamber 1a (see FIG. 2). For example, the shafts or chutes 13 will discharge particles of flour, rubbings or crumbs separated from the dough advancing on the conveyor 3, and any other solid impurities. Such particulate matter, especially the impurities separated from the conveyed goods by the chains or links of the conveyor 3, could form a sooty adhesive layer which is strongly heat insulating and would hinder the baking operation. Such layer would normally deposit on the chains or links of the conveyor, on the plate 3a, on the lamps 7 and on the reflectors in the lower baking chamber 1a, and would thus reduce th heating effect of the oven. The layer would also prevent proper regulation of the heating conditions. For example, the shafts or chutes 13 may divide the lower baking chamber 1a into three zones ZO the median zone of which is normally longer than the other two zones. The walls 15 of the chutes 13 prevent an equalization of temperatures prevailing in said zones. The receptacles 14 are placed onto a second supporting plate 3b which extends the full length of the lower baking chamber 1a between the runs of the conveyor 3. The receptacles may be periodically removed to evacuate the waste material accumulated therein.

The undersides of the bakery products advanced by the upper run of the conveyor 3 are heated by obscure radiators or electric strip heaters 17 provided with reflectors 17a and mounted on the lower supporting plate 3b. The radiators 17 may be replaced by heat-radiation absorbing metallic sheets or the like. For example, the lower supporting plate 3b may constitute such a radiation-absorbing and emitting body. The air heated by the radiators 17 is prevented from spreading the full length of the lower baking chamber 1a by the walls 15 of the aforementioned partitions or chutes 13, i.e. an equalization of temperatures prevailing in the adjacent zones ZO is not possible. The spacing of heating elements 17 and of their reflectors 17a depends upon the desired distribution of temperatures in the lower baking chamber 1a.

Above the upper baking chamber 1, the baking oven BO comprises a dome 18 which houses the steam and water vapor or damp generating means including the main steam or vapor supply pipes 19. Suitable conduits 20 are connected to the piping 19 to deliver steam at low pressures into the baking chambers 1 and 1a. Adjacent to the discharge opening 5, there is provided in the upper baking chamber 1, a sprinkling assembly 21 which serves as a means for cooling the baked products before the latter are removed from the oven. If desired, the baking chambers 1 and 1a may be coated with refractory sheet metal plates 22 or the like. The oven further comprises one or more vapor or damp discharging tubes as well as various thermal elements for measuring and regulating the temperatures prevailing in the compartments of the baking chambers 1 and 1a. In addition, the oven may include non-represented means for preheating the chains of the conveyor 3 as well as a suction device for withdrawing the fumes.

It will be seen that our invention resides in provision of a steam-tightly sealed oven which subjects the bakery products to the controllable action of infra-red lamps in the presence of water vapor, and such action is maintained for a comparatively short period of time. The infra-red rays will act directly against the upper and lateral sides of the bakery products whereas the undersides of the products are heated by radiation-absorbing and emitting sheet metal plates or the like, also in the presence of adjustable quantities of water vapor which is introduced from the outside during the formation of crumby texture in the bread loaf or the like and forms a damp in the baking chamber. While passing toward the upper and lateral sides of the conveyed products, the infra-red rays can readily penetrate the layer of water vapor or damp in both baking chambers. Toward the end of the baking operation, i.e. during the formation of the crust, the bakery products are exposed merely to heat radiation as the supply of water vapor is then shut off. In contrast to the action of long-wave infra-red rays, the short-wave infra-red rays will penetrate into the interior of conveyed bakery products to a depth of several centimeters which, due to the presence of water vapor in the initial stage of the baking operation, prevents premature formation of crust on the bread loaf, roll or the like. Such action of the rays emanating from the short-wave infra-red lamps 7 brings about a strong heat transfer into the interior of each bakery product advanced by the conveyor 3 while the elasticity of the outer layer remains unchanged and, if the intensity of radiation is increased, such mode of operation prevents cracking or blistering of the goods during the expansion stage. This brings about the added advantage that the goods may expand to their maximum volumes. It will be readily understood that the intensity of radiation and the admission of damp-forming water vapors may be varied within a certain range if it is desired to bring about a specific baking effect.

By heating to a temperature of between 95–98° C., a coagulation of albumin and agglutination of starch in the interior of the conveyed goods occurs simultaneously with the completion of swelling and bonding of water. Thus, the temperatures prevailing in the interior of a product treated in accordance with my invention will seldom reach or exceed 100° C. This completes the formation of the crumby texture whereupon, and as described hereinbefore, the crust is formed by the action of short-wave infra-red rays and in the absence of water vapor.

The entire baking operation is reduced to about one-half the time necessary in the presently known baking processes. Thus, a loaf of bread weighing 1½ kg. will be baked in about 20–25 minutes, while the baking of a roll weighing about 40 grams requires between 8 and 9 minutes.

A very important advantage of the improved apparatus is that no preheating is necessary for the baking operation, i.e. the baking of bread or other bakery products may begin as soon as the circuit of the infra-red lamps 7 is completed and as soon as the conduits 20 are opened to admit water vapor into certain compartments of the baking chambers 1 and 1a. As is known, the lamps 7 are capable of reacting immediately to any changes in the intensity of current, which allows for very satisfactory regulation of the baking operation.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An oven for the baking of bread and like bakery products which comprises, in combination: a housing defining a steam-tight, tunnel-shaped baking chamber having spaced inlet and outlet means; conveyor means mounted in the chamber for advancing the products; carrier means of insulating material mounted in the housing and constituting the upper wall of said chamber, said carrier means having a plurality of openings; a plurality of lamps in said chamber above the conveyor means for producing shortwave infra-red rays; conical socket means for each of said lamps, each socket means extending upwardly through one of said openings and having a line contact with said carrier means; and means for sealing the openings at the upper side of said carrier means; a plurality of partitions extending downwardly from said carrier means intermediate said inlet and outlet means for subdividing the chamber above said conveyor means into a series of first compartments, the number of lamps in at least one compartment which is closer to said inlet means than said outlet means being greater than the number of lamps in each compartment located between said one compartment and said outlet means; means located below the conveyor means for heating the under sides of the bakery products advancing with the conveyor means; means for subdividing the chamber below the conveyor means into a series of second compartments; and means for introducing water vapors into at least one first and second compartment.

2. An oven for the baking of bread and like bakery products which comprises, in combination: a housing defining a steam-tight, tunnel-shaped baking chamber having spaced inlet and outlet means; conveyor means mounted in the chamber for advancing the products; carrier means of insulating material mounted in the housing and constituting the upper wall of said chamber, said carrier means having a plurality of openings; a plurality of lamps in said chamber above the conveyor means for producing shortwave infra-red rays; conical socket means for each of said lamps, each socket means extending upwardly through one of said openings and having a line contact with said carrier means; and means for sealing the openings at the upper side of said carrier means, said sealing means comprising a cap for each socket means and a threaded ring for releasably fixing the cap to the carrier means; a plurality of partitions extending downwardly from said carrier means intermediate said inlet and outlet means for subdividing the chamber above said conveyor means into a series of first compartments, the number of lamps in at least one compartment which is closer to said inlet means than said outlet means being greater than the number of lamps in each compartment located between said one compartment and said outlet means; means located below the conveyor means for heating the under sides of the bakery products advancing with the conveyor means; means for subdividing the chamber below the conveyor means into a series of second compartments; and means for introducing water vapors into at least one first and second compartment.

3. An oven for the baking of bread and like bakery products which comprises, in combination: an elongated housing defining a steam-tight, tunnel shaped baking chamber, said housing having a sealable inlet opening at one end thereof and a sealable discharge opening at the other end thereof; continuously driven conveyor means mounted in the chamber and having an upper run for advancing the products in a direction from the inlet opening to the discharge opening; a supporting plate for the upper run of said conveyor means, said plate having a plurality of spaced apertures and dividing the baking chamber into an upper chamber and a lower chamber; carrier means of insulating material mounted in the housing and constituting the upper wall of said upper chamber; a plurality of lamps for producing short-wave infra-red rays each mounted in said carrier means and each extending into said upper chamber; a plurality of partitions extending downwardly from said carrier means for subdividing the upper chamber into a series of first compartments, the number of lamps in the compartments closer to said inlet opening being greater than the number of lamps in the compartments closer to said discharge opening; means located in the lower chamber for heating the under sides of the bakery products advancing with the conveyor means; means for subdividing the lower chamber into a series of second compartments, each of said means comprising a chute connected to and communicating with an aperture in said supporting plate for receiving and conveying solid impurities entrained by the upper run of said conveyor means along said supporting plate; and means for introducing water vapors into at least one first and second compartment adjacent to said inlet opening.

4. An oven for the baking of bread and like bakery products which comprises, in combination: an elongated housing defining a steam-tight, tunnel shaped baking chamber, said housing having a sealable inlet opening at one end thereof and a sealable discharge opening at the other end thereof; continuously driven conveyor means mounted in the chamber and having an upper run for advancing the products in a direction from the inlet opening to the discharge opening; a supporting plate for the upper run of said conveyor means, said plate having a plurality of spaced apertures and dividing the baking chamber into an upper chamber and a lower chamber; carrier means of insulating material mounted in the housing and constituting the upper wall of said upper chamber; a plurality of lamps for producing short-wave infra-red rays each mounted in said carrier means and each extending into said upper chamber; a plurality of partitions extending downwardly from said carrier means for subdividing the upper chamber into a series of first compartments, the number of lamps in the compartments closer to said inlet opening being greater than the number of lamps in the compartments closer to said discharge opening; means located in the lower chamber for heating the under sides of the bakery products advancing with the conveyor means; means for subdividing the lower chamber into a series of second compartments, each of said means comprising a chute connected to and communicating with an aperture in said supporting plate for receiving and conveying solid impurities entrained by the upper run of said conveyor means along said supporting plate; a receptacle disposed below each of said chutes for receiving the impurities conveyed by the latter; and means for introducing water vapors into at least one first and second compartment adjacent to said inlet opening.

5. An oven for the baking of bread and like bakery products which comprises, in combination: an elongated housing defining a steam-tight, tunnel shaped baking chamber, said housing having a sealable inlet opening at one end thereof and a sealable discharge opening at the other end thereof; continuously driven conveyor means mounted in the chamber and having an upper run for advancing the products in a direction from the inlet opening to the discharge opening; a supporting plate for the upper run of said conveyor means, said plate having two spaced apertures and dividing the baking chamber into an upper chamber and a lower chamber; carrier means of insulating material mounted in the housing and constituting the upper wall of said upper chamber; a plurality of lamps for producing short-wave infra-red rays each mounted in said carrier means and each extending into said upper chamber; a plurality of partitions extending downwardly from said carrier means for subdividing the upper chamber into a series of first compartments, the number of lamps in the compartments closer to said inlet opening being greater than the number of lamps in the compartments closer to said discharge opening; means located in the lower chamber for heating the under sides of the bakery products advancing with the conveyor means; a pair of second partitions for subdividing the lower chamber into three second compartments, each second partition consisting of a chute connected to and communicating with an aperture in said supporting plate for receiving and conveying solid impurities entrained by the upper run of said conveyor means along said supporting plate; and means for introducing water vapors into at least one first and second compartment adjacent to said inlet opening.

References Cited in the file of this patent

UNITED STATES PATENTS

| | | |
|---|---|---|
| 1,465,615 | Nelson | Aug. 21, 1923 |
| 1,653,774 | Kuhtz | Dec. 27, 1927 |
| 2,340,354 | Wells | Feb. 1, 1944 |
| 2,349,300 | Olsen | May 23, 1944 |
| 2,454,370 | Beaubien | Nov. 23, 1948 |
| 2,504,110 | Davis et al. | Apr. 18, 1950 |
| 2,767,667 | Spooner | Oct. 23, 1956 |
| 2,942,562 | Luc | June 28, 1960 |